July 16, 1940.                R. D. EVANS                2,208,414
                        EXCITATION CONTROL APPARATUS
                            Filed March 31, 1938
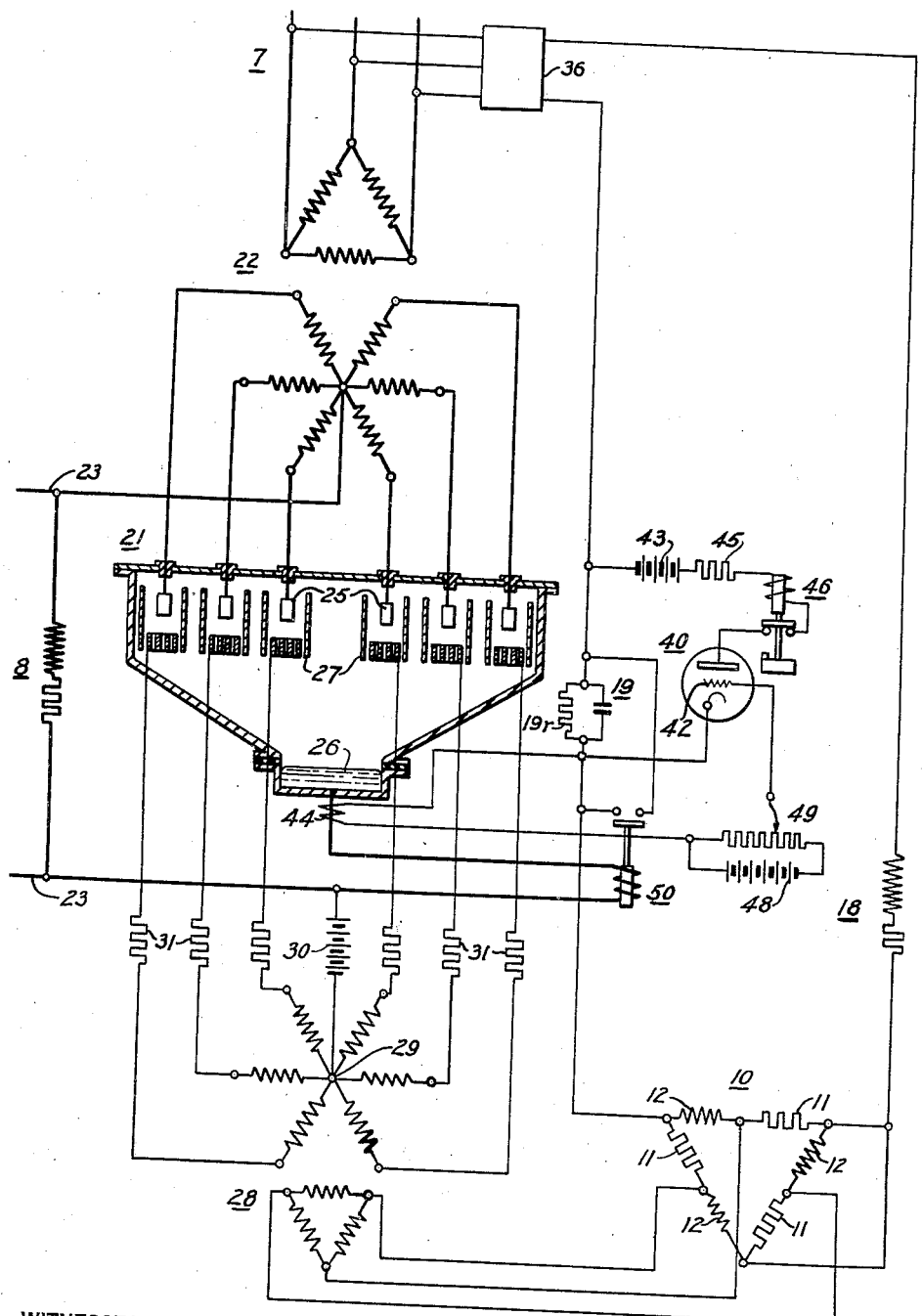
WITNESSES:
H. F. Susser.
New. C. Groome
INVENTOR
Robert D. Evans.
BY
S. O. Harrison
        ATTORNEY Patented July 16, 1940

2,208,414

UNITED STATES PATENT OFFICE 2,208,414

EXCITATION CONTROL APPARATUS

Robert D. Evans, Pittsburgh, Pa., assignor to Westinghouse Electric & Manufacturing Company, East Pittsburgh, Pa., a corporation of Pennsylvania Application March 31, 1938, Serial No. 199,177

2 Claims. (Cl. 175—363)

My invention relates to electric discharge apparatus of the type used to transfer electric energy between a plurality of power circuits, and particularly to such apparatus as applied to the transfer of power to or from a direct-current power circuit. As examples of the classes of apparatus to which the invention is applicable may be mentioned mercury-arc rectifiers and inverters.

In my prior U. S. Patents 2,053,426 and 2,053,427 issued September 8, 1936, and assigned to Westinghouse Electric & Manufacturing Company, I have disclosed a static impedance excitation system applicable to electric discharge apparatus of the type indicated above which will provide for shifting a system of excitation voltages having a fixed relationship of phase positions, through a phase angle without change of the magnitude or relative phase postitions of the component excitation voltages. As explained in my above-mentioned patents, such excitation apparatus may be used to provide excitation for a polyphase rectifier and to interrupt or decrease the power flow through the rectifier in the event of an arc-back or other fault.

It is an object of the present invention to provide a novel excitation system of the type indicated above, which will provide for the interruption or decrease of power flow through an electric discharge device, in response to an arc-back or other fault, within an extremely short time interval.

Other objects of my invention will become evident from the following detailed description, taken in conjunction with the accompanying drawing, in which the single figure is a diagrammatic view of a polyphase rectifier control system embodying my invention.

Referring to the drawing in detail, suitable polyphase space-discharge apparatus, shown as a six-phase grid-controlled rectifier 21, is connected to a polyphase alternating-current feeder 7 by means of a rectifier transformer 22, and to a direct-current load circuit 23, in the usual manner. The impedance of the load circuit 23 is indicated diagrammatically at 8.

The rectifier transformer 22 may be of any suitable type known in the art, and for simplicity is shown as comprising three-phase delta-connected primary windings and six-phase star-connected secondary windings, without interphase windings or impedances.

The rectifier 21 comprises an evacuated vessel containing suitable anodes 25 in spaced relationship to a mercury or galium pool cathode 26, and having static control grids 27 surrounding the anodes 25. As the construction of such devices is well known in the art, a detailed description is considered unnecessary. It will be understood that in operation the evacuated vessel is filled with vapor at low presure from the cathode 26. An arc discharge takes place continuously from the cathode 26 to the anodes 25 in succession, depending upon the order in which the electrostatic fields produced by each anode 25 and its associated grid 27 becomes more positive than the field produced by the anode carrying the current.

An excitation transformer 28 is provided for exciting the grids 27 of the rectifier 21 in a six-phase sequence corresponding to the sequence of energization of the corresponding anodes 25. The excitation transformer 28 is preferably provided with a saturable core, of known design, for producing secondary voltages of peaked wave form. As shown, the excitation transformer 28 is connected delta-star with a neutral point 29 which is connected to the cathode terminal of the rectifier 21. A suitable biasing element, such as a battery 30, may be included in the connection of the neutral point 29 to the cathode terminal for biasing the grids 27 negatively in well known manner. Suitable grid resistors 31 are interposed between the output terminals of the excitation transformer 28 and grids 27 of the rectifier 21.

The primary windings of the excitation transformer 28 are connected to output terminals of a delta mesh 10 consisting of three equal impedance elements 11 and three equal impedances 12. The impedances 12 have the same absolute magnitude of the impedance elements 11, but have a power factor angle differing from that of the impedance elements 11 by a phase angle of 60° in the lagging direction. Preferably the impedance elements 11 are resistors, in which event the impedances 12 are inductive with a power factor angle of 60°.

The delta mesh 10 is connected, in series with two external impedances 18 and 19, to the terminals of a phase modifying device 36 energized from the polyphase feeder 7. The phase modifying device 36 preferably includes a positive sequence voltage filter for maintaining a relatively high value of single-phase voltage available in the event of an unsymmetrical fault, and may also include such phase-shifting elements as may be necessary to fix the phase position of excitation voltage applied to the grids 27 at an optimum value as compared to the phase position of voltages impressed on the corresponding anodes 25.

The constants of the impedances 18 and 19 are related to the constants of the delta mesh 10 in such manner that with both impedances 18 and 19 in circuit, the phase angle of grid voltages is such that the rectifier 21 passes current normally, whereas when the impedance 19 is short circuited, the rectifier 21 is ineffective to pass appreciable amounts of power. This result may be conveniently effected by relating the various constants so that short circuiting of the impedance 19 will shift the phase angle of excitation voltages applied to the grids 27 through an angle of the order of 90°, without change of the magnitudes or relative phase position of the excitation voltages. One set of satisfactory values for accomplishing this result is as follows:

$$Z_{18}=(1.5-j.866)r\epsilon^{j90}$$
$$Z_{19}=(1.5+j.866)r\epsilon^{-j90} \quad \quad (1)$$

where $Z_{18}$=impedance of element 18
$Z_{19}$=impedance of element 19
$r$ =resistance of element 11
$j$ =the imaginary $(-1)^{1/2}$
$\epsilon$ =the base of natural logarithms Using the above notation, the impedance $Z_{11}$ of the impedances 11 is $$Z_{11}=r\epsilon^{j60} \quad \quad (2)$$

In order to interrupt the flow of power through the rectifier 21 without appreciable delay in the event of an arc-back, I provide an arrangement of electronic apparatus involving no moving parts which controls one or both of the impedances 18 and 19 to produce a shift of excitation voltages of the order of 90° upon the occurrence of such a fault. Although such a shift may be brought about in various ways, I preferably provide a gaseous type discharge device 40 in parallel to the impedance element 19 and provide for the firing or breakdown of the discharge device 40 in response to the arc-back.

The gaseous discharge device 40 is preferably a three-element gas-filled tube of the so-called thyratron or grid-glow type. This device includes a control electrode 42 which serves to completely block any discharge between the principal electrodes until the potential of the control electrode 42 becomes more positive with reference to the tube cathode than a predetermined value dependent upon the value of plate voltage impressed between the principal electrodes of the tube. The tube 40 has the usual characteristic of gas-filled tubes, that after the control electrode potential becomes such as to permit the passage of current between the principal electrodes, a discharge takes place which continues, regardless of the condition of the control electrode, until the positive potential of the anode drops to a relatively low cut-off value.

The control electrode 42 is connected to an air core transformer 44 in the direct-current circuit of the rectifier 21 in such direction that reversal or interruption of the normal current flow in the direct-current circuit of the rectifier 21 will cause a positive induced voltage to be applied to the control electrode 42.

The principal electrodes of the discharge device 40 are connected to the terminals of the impedance 19 in series with a suitable direct-current source 43, a current limiting resistor 45 and a circuit-opening relay 46. It will be noted from equation (1) above that the impedance of the element 19 includes a resistance component which is represented by a resistive shunt 19*r* effective to pass the discharge current of device 40.

The circuit opening relay 46 is designed to open the anode circuit of the discharge device 40 momentarily after the latter device has been conducting for a predetermined interval of time, for example, 10 seconds.

The control electrode 42 is normally biased negatively with reference to the cathode of tube 40 by means of a bias battery 48 and adjustable resistor 49.

An overload relay 50 of any suitable type is provided for mechanically short-circuiting the impedance element 19 in the event of failure of the electronic apparatus, and also in the event of a short-circuit on the direct-current load circuit 23. The overload relay 50 may be designed to close at a direct-current value of the order of 200% rated load of the rectifier 21, for example.

The constants of the direct-current circuit through the principal electrodes of discharge device 40 are so related to the constants of the alternating-current circuit including the impedance element 19, that the maximum instantaneous alternating IZ drop occuring in the impedance element 19 is ineffective to interrupt the direct-current flow through the device 40 when the latter is in conducting condition.

The operation of the above-described apparatus may be set forth as follows: During normal conditions of the rectifier 21, unidirectional current flows between the cathode 26 and each of the anodes 25 in succession as described in detail in my prior Patent No. 2,053,427, mentioned above.

In the event that an arc-back occurs in the rectifier 21, the current passing the cathode 26 reverses and the air-core transformer 44 produces a high transient positive potential which is impressed upon the control electrode 42. In response to this potential, the tube 40 breaks down and establishes a short-circuit around the impedance 19.

In response to short-circuiting of the impedance 19, the excitation voltages impressed upon the grids 27 are rotated through an angle of 90° without change of magnitude. As explained in my prior Patent No. 2,053,427, this rotation of excitation voltages substantially interrupts the power flow through the rectifier 21, thereby clearing the arc-back. At the expiration of its time limit of 10 seconds, the circuit-opening relay 46 momentarily opens the circuit of the device 40, thereby restoring the rectifier 21 to normal operation.

In the event of a sustained fault, the relay 50 operates to short-circuit the impedance 19.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In apparatus for transferring electric energy between a direct-current power circuit and a second power circuit, polyphase electric discharge apparatus connected between said circuits, said discharge apparatus including a plurality of control electrodes corresponding to a polyphase system of discharge paths; static impedance excitation apparatus for supplying a polyphase system of electrical conditions to said control electrodes, said excitation apparatus including a first group of three impedance elements of equal predetermined impedance value, a second group of three impedance elements having absolute impedance of said predetermined value but differing in impedance phase angle by 60° from the elements of said first group, and conductors connecting said impedance elements of said first and second groups alternately in a delta mesh, said excitation apparatus being effective to maintain power flow between said circuits when said polyphase system of electrical conditions is in a predetermined normal phase position and to substantially interrupt power flow between said power circuits when said polyphase system of electrical conditions is in a different phase position; and means responsive to a rate of change of a unidirectional condition of said direct-current circuit in excess of a predetermined value for controlling said excitation means to shift said polyphase system of electrical conditions from said normal phase position to said different phase position.

2. In apparatus for transferring electric energy between a direct-current power circuit and a second power circuit, polyphase electric discharge apparatus connected between said circuits, said discharge apparatus including a plurality of control electrodes corresponding to a polyphase system of discharge paths; static impedance excitation apparatus for supplying a polyphase system of electrical conditions to said control electrodes, said excitation apparatus including a first group of three impedance elements of equal predetermined impedance value, a second group of three impedance elements having absolute impedance of said predetermined value but differing in impedance phase angle by 60° from the elements of said first group, and conductors connecting said impedance elements of said first and second groups alternately in a delta mesh, said excitation apparatus being effective to maintain power flow between said circuits when said polyphase system of electrical conditions is in a predetermined normal phase position and to substantially interrupt power flow between said power circuits when said polyphase system of electrical conditions is in a different phase position; a gas-filled discharge tube of a type effective to pass discharge current in response to a predetermined unidirectional electrode potential; inductive means connecting said direct-current power circuit and said gas-filled discharge tube, said inductive means being effective to impress said predetermined unidirectional electrode potential on said discharge tube in response to change of a unidirectional condition of said direct-current circuit at a rate in excess of a predetermined value; and means responsive to discharge current of said tube for controlling said excitation means to shift the phase angle position at which said control electrode is energized to said predetermined degree from said predetermined phase angle position to a different phase angle position.

ROBERT D. EVANS.